United States Patent [19]

Isozumi

[11] Patent Number: 5,086,244
[45] Date of Patent: Feb. 4, 1992

[54] STARTER INCLUDING AN ELECTRIC MOTOR

[75] Inventor: Shuzoo Isozumi, Hyogo, Japan

[73] Assignee: Mitsubishi Denki K.K., Tokyo, Japan

[21] Appl. No.: 660,929

[22] Filed: Feb. 28, 1991

Related U.S. Application Data

[63] Continuation of Ser. No. 384,370, Jul. 25, 1989, abandoned.

[30] Foreign Application Priority Data

Aug. 9, 1988 [JP] Japan ................. 63-105571
Nov. 8, 1988 [JP] Japan ................. 63-146096

[51] Int. Cl.⁵ ............................................. H02K 5/00
[52] U.S. Cl. ..................................... 310/89; 310/43; 310/45; 310/91; 310/248
[58] Field of Search ............... 310/89, 90, 91, 686, 310/298, 239, 249, 42, 43, 258, 45; 290/48

[56] References Cited

U.S. PATENT DOCUMENTS

| | | | |
|---|---|---|---|
| 1,115,947 | 11/1914 | Lincoln | 310/258 |
| 1,611,942 | 12/1926 | Persons | 310/258 |
| 2,514,693 | 7/1950 | Chapman | 310/686 |
| 2,650,316 | 8/1953 | Johns | 310/258 |
| 2,792,512 | 5/1957 | Koch | 310/90 |
| 3,205,382 | 9/1965 | Baumhart | 310/89 |
| 3,699,366 | 10/1972 | Wood | 310/91 |
| 3,946,260 | 3/1976 | Frezzolini | 310/89 |
| 4,128,935 | 12/1978 | Czech | 310/89 |
| 4,355,253 | 10/1982 | Vollbrecht | 310/239 |
| 4,384,224 | 5/1983 | Spliter | 310/91 |
| 4,445,060 | 4/1984 | Ruhle | 310/42 |
| 4,488,073 | 12/1984 | Morishita | . |
| 4,519,261 | 5/1985 | Hamano | . |
| 4,538,085 | 8/1985 | Tanaki | 310/239 |
| 4,585,968 | 4/1986 | Cambrodon | . |
| 4,626,725 | 12/1986 | Kawada | 310/89 |
| 4,673,838 | 6/1987 | Takagi | 310/239 |
| 4,707,630 | 11/1987 | Tomite | 310/89 |
| 4,801,833 | 1/1989 | Dye | 310/89 |
| 4,900,967 | 2/1990 | Amano | 310/239 |
| 4,972,113 | 11/1990 | Newberg | 310/258 |

FOREIGN PATENT DOCUMENTS 2203014 7/1973 Fed. Rep. of Germany ........ 310/89
3304920 8/1984 Fed. Rep. of Germany ........ 310/89

Primary Examiner—R. Skudy
Attorney, Agent, or Firm—Sughrue, Mion, Zinn, Macpeak & Seas

[57] ABSTRACT

A starter having an electric motor which has a yoke constituting the magnetic circuit of the motor and the outside portion of the starter, and a bowl-shaped rear cover made of a resin and secured to the rear end of the yoke by longitudinal bolts, wherein each of said bolts comprises a slender portion which extends in parallel with the axis of the starter through a support plate borne at the rear end of the yoke and extending inward in the radial direction of said yoke and has a front part engaged with the front cover of the starter and a rear threaded part projecting out through the insertion hole of the rear cover, and a spacer provided on the slender portion and located in contact with the plate and the inside surface of the end wall of the rear cover at both the ends of the the spacer; and nuts are engaged with the rear threaded parts of the slender portions of the bolts to attach the rear cover to the rear end to the yoke.

11 Claims, 2 Drawing Sheets

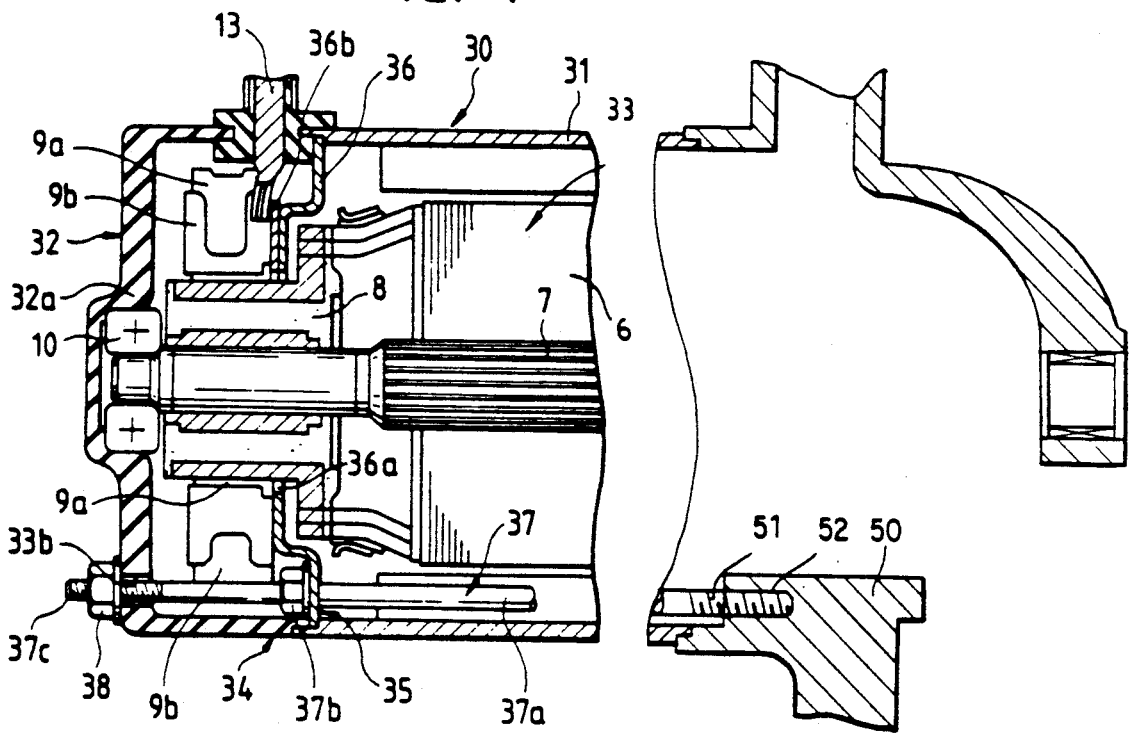
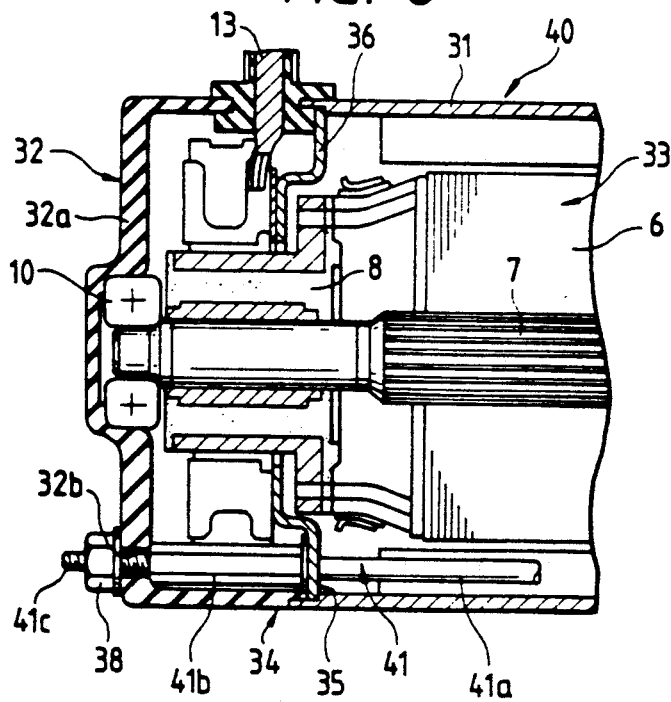
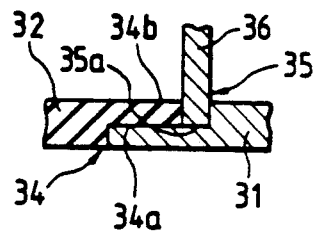

STARTER INCLUDING AN ELECTRIC MOTOR

This is a continuation of application Ser. No. 07/384,370 filed July 25, 1989.

BACKGROUND OF THE INVENTION

The present invention relates to a starter, particularly to a starter for starting the engine of a vehicle.

FIG. 1 shows a conventional starter 1 for starting the engine of a vehicle. The DC motor 5 of the starter 1 has a yoke 2 constituting the magnetic circuit of the motor and the outside portion of the starter, a bowl-shaped rear cover 4 secured to the rear open end (which is the left-hand end as to FIG. 1) of the yoke by longitudinal bolts 3, an armature core 6, an armature shaft 7 fitted with the core, a commutator 8 mounted on the shaft at the rear end thereof, and brush holders 9b supporting brushes 9a and disposed at equal circumferential intervals around the commutator. The bowl-shaped rear cover 4 is made of a synthetic resin and fitted to the rear open end of the yoke 2 so that the rear cover and the brushes 9a surround the commutator 8. The armature shaft 7 is supported at the rear end thereof by a bearing 10 provided in the recess of the central portion of the end wall 4a of the rear cover 4. A mounting plate 11, to which the brush holders 9b are attached, is secured to the inside surface of the end wall 4a of the rear cover 4 by screws 12. The plus brush 9a is connected to a lead wire 13 connected to one contact of an electromagnetic switch not shown in FIG. 1. The minus brush 9a is connected to a lead wire 14 connected to a ground terminal.

Since the tensile forces of the longitudinal bolts 3 for securing the rear cover 4 to the yoke 2 act on the end wall 4a of the rear cover made of the synthetic resin, the end wall undergoes bending and compression so that the absolute strength, creep strength and vibration resistance of the end wall are adversely affected. Particularly, the notched portions of the rear cover 4, which are provided so that the lead wires 13 and 14 are laid through the notched portions, undergo stress concentration so that the portions are likely to be damaged. This is a problem. Besides, since the lead wire 14 and the ground terminal need to be provided to ground the minus brush 9a, the constitution of the starter is more complicated. This is another problem.

SUMMARY OF THE INVENTION

The present invention was made in order to solve the above-mentioned problems.

It is an object of the present invention to provide a starter comprising an electric motor having a yoke constituting the magnetic circuit of the motor and the outside portion of the starter; a bowl-shaped rear cover made of a resin and secured to the rear end of the yoke; supporting means for supporting the rear cover to the rear end of the yoke, wherein the minus brushes of the electric motor are grounded through the supporting means and the yoke; and securing means for securing the rear cover to the yoke through the supporting means.

Accordingly, it is another object of the present invention to provide a starter having an electric motor which has a yoke constituting the magnetic circuit of the motor and the outside portion of the starter, and a bowl-shaped rear cover made of a resin and secured to the rear end of the yoke by longitudinal bolts. Each of the longitudinal bolts comprises a slender portion which extends in parallel with the axis of the starter through a support plate borne at the rear end of the yoke and extending inward in the radial direction of the yoke and has a front part engaged with the front cover of the starter and a rear threaded part projecting out through the insertion hole of the rear cover, and a spacer provided on the slender portion and located in contact with the support plate and the inside surface of the end wall of the rear cover at both the ends of the spacer. Nuts are engaged with the rear threaded parts of the slender portions of the longitudinal bolts to attach the rear cover to the rear end of the yoke so that the end wall of the rear cover is in contact with the spacers of the bolts. Since the strong tensile forces of the bolts, which act to secure the yoke to the front cover, are borne by the support plate not to act to the rear cover made of the resin, the rear cover does not undergo compression, bending, damage or the like.

It is yet another object of the present invention to provide a starter having an electric motor which has a yoke constituting the magnetic circuit of the motor and the outside portion of the starter, and a bowl-shaped rear cover made of a resin and fitted to the rear open end of the yoke. The starter includes a metal plate which is pinched between the rear open end of the yoke and the rear cover and whose central portion has an opening through which the commutator of the electric motor extends, and longitudinal bolts, each of which extends through the metal plate in parallel with the axis of the starter and comprises a slender portion having a front part engaged with the front cover of the starter and a rear port projecting out through the insertion hole of the end wall of the rear cover, and a spacer provided on the slender portion and located in contact with the metal plate. Since the metal plate is interposed between the mutually fitted portions of the rear cover and the yoke so that the strong tensile forces of the longitudinal bolts, which act to secure the yoke to the front cover, do not act to the rear cover made of the resin, the rear cover does not undergo compression, bending, damage or the like.

DESCRIPTION OF THE DRAWINGS

FIG. 4 is a longitudinally-sectional partial view of a starter which is another embodiment of the present invention;

FIG. 5 is a longitudinally-sectional partial view of the mutually fitted portions of the rear cover and yoke of the starter shown in FIG. 4; and FIG. 6 is a longitudinally-sectional partial view of a starter which is yet another embodiment of the present invention.

DETAILED DESCRIPTION OF EXEMPLARY EMBODIMENTS

Embodiments of the present invention are hereafter described in detail with reference to the drawings attached hereto.

Figure 1:
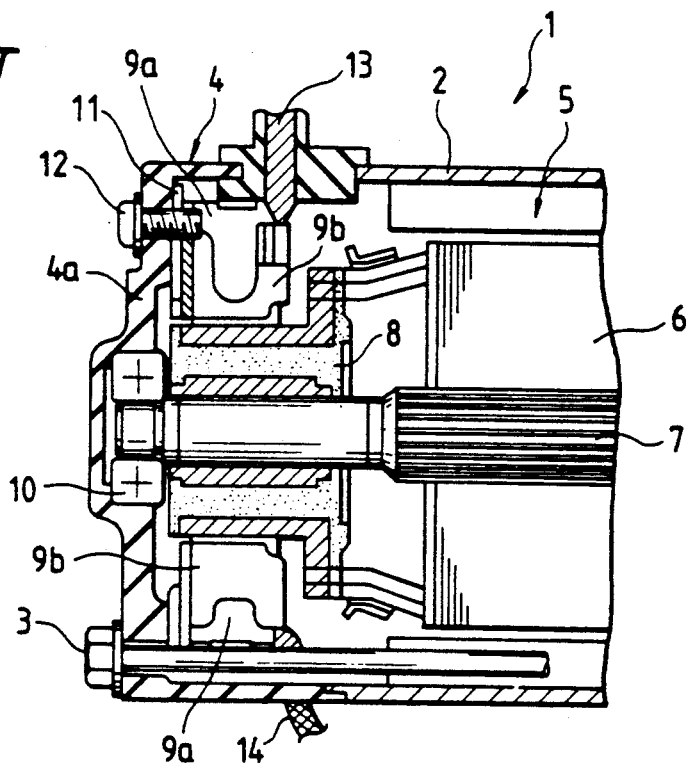
FIG. 1 is a longitudinally-sectional partial view of a conventional starter.
Figure 2:
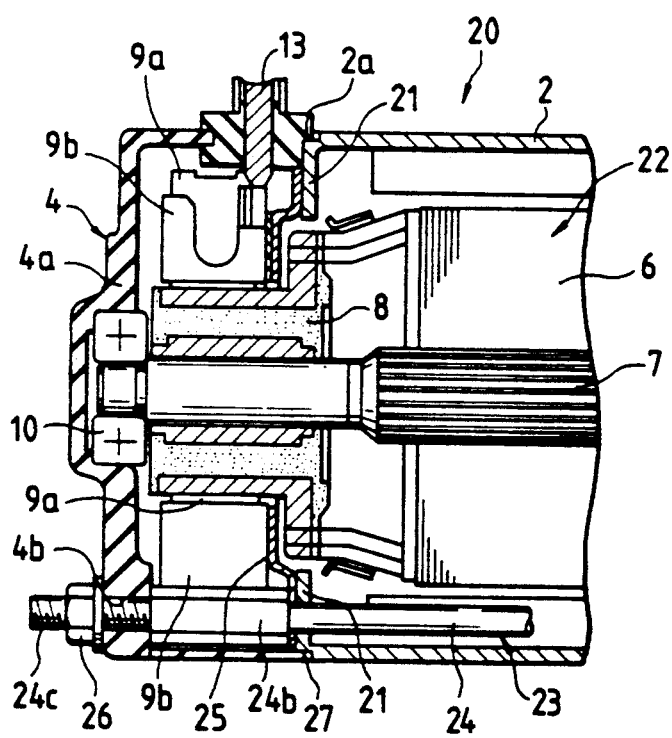
FIG. 2 is a longitudinally-sectional partial view of a starter which is an embodiment of the present invention.

FIG. 2 shows a starter 20 which is one of the embodiments. The DC motor 22 of the starter 20 has a yoke 2, a rear cover 4, an armature 6, an armature shaft 7, a commutator 8, brushes 9a, brush holders 9b, a bearing 10, and a lead wire 13 similarly to that of the above-described conventional starter 1. The rear end of the yoke 2 is bent inward in the radial direction of the starter 20 so that the yoke constitutes a support plate 21. A smaller-diameter step 2a, with which the rear cover 4 made of a synthetic resin and shaped as a bowl is screw-engaged, is provided on the outside circumferential or cylindrical surface of the yoke 2 at the rear end thereof. The front cover 50 (which is not shown in FIG. 2) but is shown in FIG. 4 of the starter 20, the rear cover 4 and the yoke 2 are secured to each other by longitudinal bolts 23 in such a manner that the yoke is interposed between the front and the rear covers.

Figure 3:
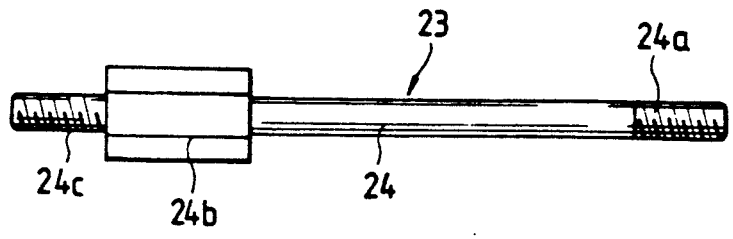
FIG. 3 is a plan view of the longitudinal bolt of the starter shown in FIG. 2.

As shown in FIG. 3 each of the longitudinal bolts 23 comprises a slender portion 24 having a threaded part 24a engaged in the tapped hole 5a of the front cover 50 (see FIG. 4 for showing of the front cover 50) or inserted into the through hole of a flange (not shown) and engaged with a nut (not shown), and a spacer 24b provided in an appropriate position integrally with the slender portion near the rear end thereof and having a larger diameter than the slender portion. The axial length of the spacer 24b is equal to the distance between the inside surface of the outer circumferential portion of the end wall of the rear cover 4 fitted to the rear end of the yoke 2 and the outside surface of a mounting plate 25 having an electric insulator. Both the ends of the spacer 24b are made flat so that the ends are kept in tight contact with the inside surface of the outer circumferential portion of the end wall of the rear cover 4 and the outside surface of the mounting plate 25. The slender portion 24 has another threaded part 24c at the rear end of the slender portion so that the threaded part is engaged with a nut 26. The outer circumferential portion of the end wall of the rear cover 4 has insertion holes 4b through which the longitudinal bolts 23 are laid. When the rear cover 4 is to be secured to the rear end of the yoke 2 by the longitudinal bolts 23, the front threaded parts 24a of the slender portions 24 of the bolts are first put forward through the insertion holes of the mounting plates 25 and engaged in the tapped holes of the front cover so that the bolts extend in the tapped holes of the front cover so that the bolts extend through the yoke 2. At that time, the spacers 24b of the bolts 23 are put in contact with the mounting plates 25 to apply a clamping force to the plates on the support plate 21 to secure the yoke 2 and the front cover to each other. The rear cover 4 made of the synthetic resin is then fitted to the rear end of the yoke 2 so that the rear threaded parts 24c of the slender portions 24 of the bolts 23 project out through the insertion holes 4b of the rear cover. At that time, a seal 27 is interposed between the smaller-diameter step 2a of the yoke 2 and the open end of the rear cover 4, and the nuts 26 are engaged with the rear threaded parts 24c and tightened so that the inside surface of the outer circumferential portion of the end wall 4a of the rear cover is put in contact with the rear ends of the spacers 24b of the bolts 23 and secured thereto by the tightening forces of the nuts. Since the tightening forces of the nuts 26 need to be only so strong as to clamp the rear cover 4 on the spacers 24b of the longitudinal bolts 23 and the strong tensile forces of the slender portions 24, which act to secure the yoke 2 and the front cover to each other, do not act to the rear cover, the rear cover does not undergo damage or the like.

The brush holders 9b supporting the plus brushes 9a are attached with the mounting plates 25 to the support plate 21, while the other brush holders 9b supporting the minus brushes 9a are directly attached to the mounting plate 25 so that the minus brushes are grounded to the yoke 2 through the holders and the support plate. Therefore, lead wires do not need to be provided to connect the minus brushes 9a to ground terminals as in the above-described conventional starter.

The spacer 24b Of each longitudinal bolt 23 may be formed as a nut separately from the slender portion 24. If the spacer 24b is formed in that manner, the rear threaded part 24c is extended to the vicinity of the support late 21, the front end of the slender portion 24 is secured to the front cover, and the spacer 24b is engaged with the rear threaded part and tightened on the support plate. Besides, the front threaded part 24a of each longitudinal bolt 23 may be substituted by a hexagonal block integrally formed on the bolt.

The support plate 21 may be provided separately from the yoke 2 and secured to the rear end thereof.

FIG. 4 shows a starter 30 which is another of the embodiments. The D, motor 33 of the starter 30 has an armature shaft 7, a commutator 8, brushes 9a, brush holders 9b, a bearing 10, and a lead wire 13 similarly to that of the above-described conventional starter. The DC motor 33 of the starter 30 also has a yoke 31 and a bowl-shaped rear cover 32 made of a synthetic resin and secured to the rear open end of the yoke. The rear cover 32 has a fitted portion 34 at the front open end of the cover. The fitted portion 34 has a notch 34a on the outside circumferential surface of the portion, as shown in FIG. 5. The yoke 31 has a fitted portion 35 at the rear open end of the yoke. The fitted portion 34 of the rear cover 32 is fitted to the fitted portion 35 of the yoke 31. At that time, the peripheral portion of a disk-shaped mounting plate 36 is fitted in a notch 35a provided on the inside circumferential surface of the fitted portion 35 of the yoke 31, and is pinched between the end of the front part 34b of the fitted portion 34 of the rear cover 32 and the inside wall surface of the yoke at the fitted portion thereof. The central portion of the mounting plate 36 has an opening 36a through which the commutator 8 extends. Each of the longitudinal bolts 37 of the starter 30 has a slender portion 37a having a front threaded part 51, and a spacer 37b provided in an appropriate position integrally with the slender portion near the rear end thereof and having a larger diameter than the slender portion. The slender portion 37a also has a rear threaded part 37c extending rearward from the spacer 37b and engaged with a nut 38. The front threaded part 51 of the slender portion 37a is engaged in the tapped hole 52 of the front cover 50 of the starter 30 or is laid through the insertion hole of a flange (not shown) and engaged with a nut (not shown).

When the rear cover 32 is to be secured to the rear end of the yoke 31 by the longitudinal bolts 37, The front threaded parts of the slender portions 37a of the bolts are first put forward through the insertion holes of the mounting plate 36 fitted to the fitted portion 35 of the yoke 31 at the rear open end thereof and are then engaged in the tapped holes of the front cover so that the slender portions extend through the yoke. At that time, the spacers 37b of the bolts 37 are put in contact with the mounting plate 36 to apply a pushing force thereto in the axial direction of the starter 30 to clamp the yoke on the front cover and clamp the mounting plate on the yoke. The fitted portion 34 of the rear cover 32 made of the synthetic resin is then fitted to the fitted portion 35 of the yoke 31 so that the rear threaded parts 37c of the longitudinal bolts 37 project out through the insertion holes 32b of the end wall 32a of the rear cover. The nuts 38 are engaged with the rear threaded parts 37c of the bolts 37 and tightened thereon. Since the tightening forces of the nuts 38 need to be only so strong as to clamp the rear cover 32 on the yoke and the front cover to each other, do not act to the rear cover, the rear cover does not undergo damage or the like.

FIG. 6 shows a starter 40 which is yet another of the embodiments. The starter 40 differs from the above-described starter 40 only in the longitudinal bolts. Each of the longitudinal bolts 41 of the starter 40 has a slender portion 41a having a front threaded part (not shown) and a rear threaded part 41c, and a spacer 41b provided in an appropriate position integrally with the slender portion near the rear end thereof. The axial length of the spacer 41b is equal to the distance between the inside surface of the outer circumferential portion of the end wall 32a of a rear cover 32 fitted to the rear end of a yoke 31 and the outside surface of a mounting plate 36. Both the ends of the spacer 41b are made flat so that the ends are kept in tight contact with the inside surface of the outer circumferential portion of the end wall 32a of the rear cover a 32 and the outside surface of the mounting plate 36. The outer circumferential portion of the end wall 32a of the rear cover 32 has insertion holes 32b through which the rear threaded parts 41c of the longitudinal bolts 41 extend. Nuts 38 are engaged with the rear threaded parts 41c of the bolts 41 and tightened to the outer circumferential portion of the end wall 32a of the rear cover 32 around the insertion holes 32b thereof so that the rear ends of the spacers 41b of the bolts are put in contact with the outer circumferential portion of the end wall of the rear cover around the insertion holes thereof. Since the tightening forces of the nuts 38 need to be only so strong as to clamp the rear cover 32 on the spacers 41b of the longitudinal bolts 41 and the strong tensile forces of the bolts and spacers 41b which act to secure the yoke 31 through the mounting plate 36 and front cover of the starter 40 to each other, do not act to the rear cover, the rear cover does not undergo damage, deformation or the like in the end wall 32a of the rear cover and in the fitted portion thereof at the yoke.

In each of the starters 30 and 40, the brush holders 9b supporting the plus brushes 9a are attached with electric insulators 36b to the mounting plate 36, and the other brush holders 9b supporting the minus brushes 9a are directly attached to the mounting plate so that the minus brushes are grounded through the brush holders, the metal plate and the yoke 31. For that reason, the minus brushes 9a do not need to be connected to ground terminals through lead wires as in the above-described conventional starter.

Although the spacers 37b and 41b of the longitudinal bolts 37 and 41 of the starters 30 and 40 are formed integrally with the slender portions 37a and 41a of the bolts, the spacers may be formed as nuts separately form the slender portions. If the spacers 37b and 41b are formed as nuts separately from the slender portions 37a and 41a, each of the rear threaded parts 37c and 41c of the bolts is extended to the vicinity of the mounting plate a 36 so that the spacers are engaged with the rear threaded parts and tightened to the metal plate, after the front threaded parts of the slender portions of the bolts are secured to the front cover.

Although the stator of each of the starters 20, 30 and 40 is made of permanent magnets, the stator may be made of electromagnetic coils instead.

What is claimed is:

1. A starter comprising:
    an electric motor comprising plus brushes and minus brushes, a shaft disposed in an axial direction, an armature affixed to a portion of said shaft and a yoke, operative as a magnetic circuit for said motor and comprising an outside portion of said starter, said yoke having a substantially cylindrical shape providing an inside circumferential surface and an outside circumferential surface, a length in said axial direction and at least a rear open end and a front end;
    a bowl-shaped rear cover made of a resin and securable over said rear open end of said yoke;
    ;supporting means for supporting said rear cover by a predetermined spacing distance from said rear open end of said yoke, said supporting means being electrically connected to said minus brushes of said electric motor whereby said minus brushes are electrically grounded through said supporting means and said yoke; and
    means for securing said rear cover to said yoke through said supporting means by applying a force thereto, such that said force is borne by said supporting means and does not act on said bowl-shaped rear cover.

2. A starter comprising:
    an electric motor comprising plus brushes and minus brushes, a shaft disposed in an axial direction, an armature affixed to a portion of said shaft and a yoke, operative as a magnetic circuit for said motor and comprising an outside portion of said starter, said yoke having a substantially cylindrical shape providing an inside circumferential surface and an outside circumferential surface, a length in said axial direction and at least a rear open end and a front end;
    a bowl-shaped rear cover made of a resin and securable over said rear open end of said yoke;
    supporting means for supporting said rear cover of said yoke; and said supporting means comprising a disk-shaped mounting plate affixed to said rear open end of said yoke and extending inward in the radial direction of said yoke; and means for securing said rear cover to said yoke through said supporting means by applying a force thereto, said disk-shaped mounting plate being operative to transmit said force of said securing means to said yoke such that said force is borne by said yoke and does not act on said bowl-shaped rear cover.

3. A starter according to claim 2, in which the rear end of said yoke is bent inward in the radial direction of said starter to define a bent portion, wherein said bent portion is secured to said mounting plate by said securing means.

4. A starter according to claim 2, in which said mounting plate has an electric insulator provided between the plus brushes of said electric motor and said mounting plate.

5. A starter according to claim 1, in which said rear cover comprises insertion holes and said securing means comprises:
    bolts, each having a slender portion which extends in parallel with the axis of said starter through said supporting means and has a front part engaged with said front cover of said starter and a rear threaded part projecting out through said insertion holes of said rear cover;

spacers, each provided on said slender portion and located in contact with said supporting means at the end of said spacer; and nuts, each engaged with the rear threaded parts of the slender portions of said bolts to attach said rear cover over said rear open end of said yoke.

6. A starter according to claim 5, in which said rear cover has a wall comprising an inside surface and said spacer is provided on said slender portion and located in contact with said supporting means and the inside surface of the wall of said rear cover at both the ends of said spacer.

7. A starter according to claim 5, in which said spacer of each longitudinal bolt is formed as a nut separately form the slender portion.

8. A starter according to claim 1, in which a smaller-diameter step, with which the rear cover made of a synthetic resin is threadedly engaged, is provided on said outside circumferential surface of said yoke at said rear open end thereof.

9. A starter according to claim 1, in which said supporting means has a peripheral portion and said yoke has a notch provided on the inside circumferential surface of said yoke and said peripheral portion of said supporting means is fitted in said notch.

10. A starter according to claim 8, further comprising a seal interposed between said smaller-diameter step of said yoke and said rear open end of the rear cover.

11. A starter comprising:

an electric motor comprising a shaft disposed in an axial direction and defining an axis of said starter and a yoke, operative as a magnetic circuit for said motor and comprising an outside portion of said starter, said yoke having a substantially cylindrical shape with said yoke extended a radial distance from said axis and having at least a rear end with an opening and a front end with an opening;

a support plate attached to said rear end of said yoke and extending inward over said opening in a radial direction toward said axis;

a front cover securable over said front end of said yoke;

a bowl-shaped rear cover made of a resin and having insertion holes and being securable over said rear end of said yoke; longitudinal bolts, wherein each of said bolts comprises a slender portion which extends in parallel with the axis of said starter through said support plate and has a front part engaged with said front cover of said starter and a rear threaded part projecting out through a respective insertion hole of said rear cover, and a spacer having two ends spaced a predetermined distance apart and being provided on said slender portion and located in contact with said plate and said rear cover at respective ends of said spacer; and nuts engaged with said rear threaded parts of the slender portions of said bolts so as to create tensile forces in said bolts and to attach said rear cover to the rear end of said yoke, said tensile forces being transmitted by each said spacer to said support plate so as not to act on said bowl-shaped rear cover.

* * * * *